May 2, 1961 R. A. FRYKLUND 2,982,940
ECHO-RANGING SYSTEM
Filed March 13, 1956

INVENTOR
ROBERT A. FRYKLUND
BY Elmer J. Gorn
ATTORNEY

United States Patent Office 2,982,940
Patented May 2, 1961

2,982,940
ECHO-RANGING SYSTEM
Robert A. Fryklund, Johnson City, N.Y., assignor to Raytheon Company, a corporation of Delaware
Filed Mar. 13, 1956, Ser. No. 571,296
4 Claims. (Cl. 340—3)

This invention relates to an echo-ranging system, and more particularly, to an echo-expanding, recording system for depth sounders.

In this invention there is disclosed an echo-ranging system comprising a record medium, a recording member, and speed control apparatus for moving said member along a path across said medium. In the preferred embodiment, a two-speed control drive is used, wherein a low speed is used for a searching operation and a high speed is used for an expanded sweep operation. When the expanded sweep is in use, a delay unit is used for providing a delayed output signal in response to an input signal which is triggered by said recording member. This delayed output signal is, in turn, used to trigger a source of periodic oscillations which is directed to a radiation system, such as a transducer, for radiating said oscillations and receiving reflected echo signals. The received reflected signals are then fed to said record medium. In the preferred embodiment, the delay unit is made continuously variable in order to centrally locate any received echo on said record medium.

Figure 1:
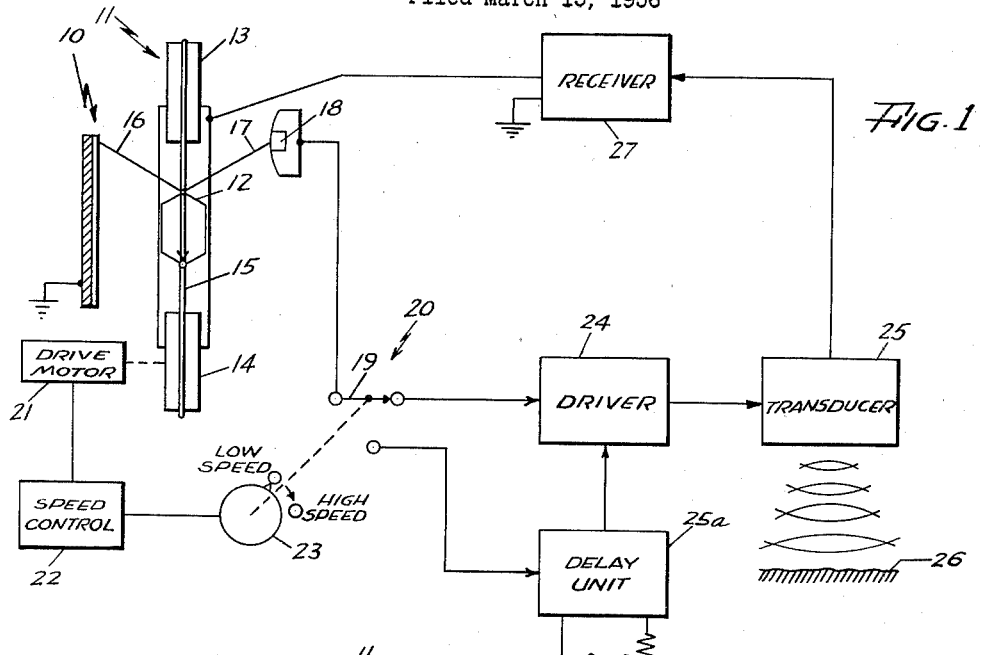
Figure 2:
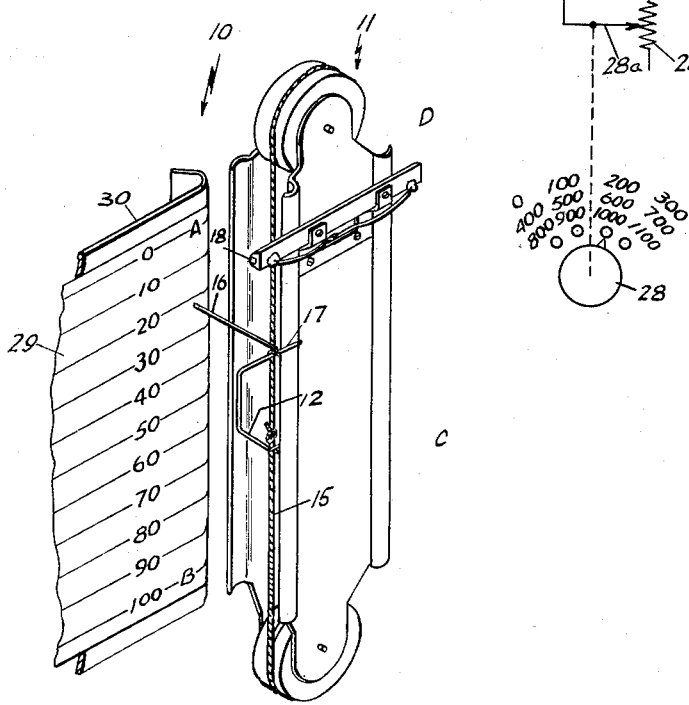

Further objects and advantages of this invention will be made more apparent as the description progresses, reference now being made to the accompanying drawing wherein:

Fig. 1 is a block diagram of the complete system disclosed in this invention; and Fig. 2 illustrates a preferred embodiment of the record medium and recording member.

Referring now to Fig. 1, there is shown a record medium 10 and recording member assembly 11, which is similar to that disclosed in my copending application entitled, "Depth-Sounding Devices," filed April 24, 1953, Serial No. 350,788, now U.S. Patent No. 2,869,109 issued January 13, 1959. Recording member assembly 11 consists of a stylus member 12 being moved over a pair of pulleys 13 and 14 by a suitable drive 15. Stylus member 12 has two contacting parts of which part 16 is used for recording an indication on record medium 10, and part 17 is used for providing a triggering pulse through keying contact 18. Keying contact 18 is connected to a movable arm 19 of switch 20. A drive motor 21 and associated speed control 22 is mechanically coupled to pulley 14 for providing the necessary speed and direction for stylus member 12. Speed control 22 is capable of controlling the speed of drive motor 21 continuously from a fixed low speed to a fixed high speed by means of a control arm 23. In the preferred embodiment, a low speed was chosen in order to provide a range of from 0 to 100 fathoms on one sweep of stylus 12 across recording member 10. A high speed, operating at six times the speed of the low speed, was chosen in order to provide a range of 100 feet in one sweep of stylus member 12 across record medium 10. The advantage of having the speed of drive motor 21 variable over a continuous range will be apparent as the description progresses. Control arm 23 is mechanically linked with operating arm 19 of switch 20 in such a manner that whenever control arm 23 is in the low speed position, operating arm 19 will direct the impulse from keying contact 18 directly to a driver stage 24. For any other position of control arm 23, which includes all speeds other than low speed up to and including the high speed, operating arm 19 will be moved so as to direct the pulse from keying contact 18 directly to a variable delay unit 25a. The sequence of operation with control arm 23 in the low speed position will provide a normal pulse directly from keying contact 18 to impulse driver stage 24, which, in turn, will produce a source of periodic oscillations. These oscillations are directed to transducer 25, which directs the oscillations through the medium encompassing said transducer to the ultimate target 26. Reflections from target 26, in the form of reflected echo signals, will be directed back to transducer 25 which, in turn, will feed the signals to receiver 27 where the signals will be ultimately directed to stylus member 12, and record medium 10.

Whenever a 100-foot segment of the sweep is to be investigated, control arm 23 is moved to the high speed position, which has the effect of moving operating arm 19, thereby resulting in the keying impulse from keying contact 18 being directed to delay unit 25a where the input signal will be delayed an amount controlled by dial 28. Dial 28, through a mechanical connection here indicated by a broken line controls operating arm 28a of continuously variable resistor 28b, thereby allowing delay unit 25a to emit a delayed signal continuously variable over its operating range. This delayed signal is then directed to driver stage 24 in the same manner as the previously-explained undelayed signal, thereby repeating the same sequence of events. In the preferred embodiment, dial 28 has a plurality of detented positions, preferably four in number, appropriately labelled as to which one hundred-foot segment will be recorded on the record medium. The total delay attainable by moving operating arm 28 is continuously variable.

Referring now to Fig. 2, there is shown recording medium 10 consisting of an electrical, sensitive paper 29 moving over a guide surface 30. Paper 29 is a depth chart calibrated in equal steps from 0 to 100, and when used in conjunction with the speed control arm 23 it will be seen that at low speed 100 will indicate one hundred fathoms, and at high speed 100 will indicate one hundred feet. In order to provide equal values of delay for the expanded sweep presentation, the recording member assembly 11 has been constructed so as to provide four equal lengths that are traversed by the tip of part 16 of stylus 12. For example, the linear distance from A to B is equal to the circumferential distance traversed by the tip of part 16 from distance B to C, which again is equal to distance C to D and D to A, thereby making four equal segments traversed by the tip of stylus 12. It is well known that sound traveling in sea water travels to a depth of 400 fathoms and back to the point of sound origin in one second; therefore, sound traveling to a depth of 100 feet and return will take $\frac{1}{24}$ of a second. Therefore, with control arm 23 in a high-speed position, the distance on a recording paper 29 between A and B will represent one hundred feet, and keying part 17 of stylus 12 will pass keying contact 18 six times per second. Assuming that the driver 24 is keyed into operation when the stylus is at point A in its path and that a target is situated at a depth of 250 feet, the stylus will have moved from point A to a point between C and D (Fig. 2) before an echo is received at which time the stylus is off the paper 29 and no indication of a target echo will appear on the chart. in order to insure that the stylus is bearing on the paper at the time an echo is received from a target 250 feet below, the keying of the driver must be delayed until the stylus has reached point C in its path so that by the time an echo is received the stylus will be sweeping over the paper between points A and B. If the delay, as controlled by dial 28, is set for $\frac{1}{24}$ of a second, driver 24 is triggered as the stylus leaves the one hundred foot line on the chart, which is three hundred feet, or three twenty-fourths of a second ahead of the zero line on the chart, resulting, therefore, in any echo between three hundred to four hundred feet being recorded somewhere on the chart between the limits of A and B. It follows, therefore, that if the delay is set for $\frac{2}{24}$ of a second, any echo between the depths of 200 and 300 feet will be recorded; and for the same reasons, $\frac{3}{24}$ of a second delay will indicate targets between 100 and 200 feet; whereas, a delay of $\frac{4}{24}$ of a second will indicate targets between zero and a hundred feet. It can now be appreciated that, having the delay of delay unit 25a continuously controllable, it is possible to centrally locate the target if an echo is close to one of the extremities of the chart. For example, on the 300 to 400 foot sweep, if the target is at three hundred feet, by slightly increasing the delay time by means of the dial 28 the echo can be centralized on paper 29. In this way, any echo can be centered on the chart with a single manual control. This control can be calibrated from 0 to 400 feet in conjunction with the markings on the recording paper. Therefore, if a target is, for example, at 250 feet, dial 28 will be set at the two hundred position, and the echo will be indicated on recording paper 29 at the fifty mark, which would indicate to the operator a depth of two hundred plus fifty or two-hundred-fifty feet. If soundings are made in water deeper than 400 feet and up to 800 feet, the same increments can be covered for these depths on the second time around for stylus member 12. In addition, the range from 800 feet to 1200 feet is covered by recording on the third time around, thereby resulting in the complete range of from zero to twelve hundred feet that can be covered by 100 foot segments by simply choosing the proper keying time. This invention has particular usefulness in locating and identifying fish that are close to or near the ocean floor.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment as disclosed herein, except as defined by the appended claims.

What is claimed is:

1. An echo ranging system comprising a chart, a recording stylus, apparatus for moving said stylus about a closed path at a constant rate of speed, means for producing a keying signal at a specified point in the path of said stylus, a delay unit connected to said keying signal producing means for delaying said keying signal, a generator of periodic oscillations coupled to said delay unit and adapted to be keyed therefrom by the delayed keying signal, an energy radiation system energized by said generator, and means for receiving echo signals, said echo receiving means being connected to said stylus to cause said stylus to indicate upon said chart the reception of echo signals.

2. An echo ranging system comprising a record medium, a recording stylus, apparatus for moving said stylus about a closed path at a constant rate of speed, control means in said apparatus for presetting a selected rate of speed, means for producing a keying signal at a specified point in the path of said stylus, a delay unit connected to said keying signal producing means for delaying said keying signal, means connected to said delay unit for presetting the amount by which said keying signal is delayed, a generator of periodic oscillations coupled to said delay unit and adapted to be keyed by the delayed keying signal, an energy radiating system connected to said generator, a receiver for receiving echo signals, and means connecting said receiver to said stylus for causing said stylus to indicate upon said record medium the reception of echo signals.

3. An echo ranging system comprising a chart, a recording stylus, apparatus for moving said stylus about a closed path at a constant rate of speed to cause said stylus to sweep over the surface of said chart during a portion of its travel, control means in said apparatus for preselecting one of a plurality of rates of speed, means for producing a keying signal at a specified point in the path of said stylus, a delay unit for delaying said keying signal, a switch actuated by said control means for connecting said delay unit to said keying signal producing means, said delay unit including a control for presetting the amount by which said keying signal is delayed, an oscillation generator coupled to said delay unit and adapted to be keyed by the delayed keying signal, an energy radiating system energized by said generator, and means for receiving reflected echo signals, said echo signal receiving means being connected to said radiating system and to said stylus for causing said stylus to indicate upon said chart the reception of echo signals.

4. An echo ranging system comprising a depth chart, a recording stylus, apparatus for moving said stylus about a closed path at a constant rate of speed to cause said stylus to sweep over the surface of said chart during a portion of its travel, control means connected in said apparatus for presetting said rate of speed, means for producing a keying signal at a specified point in the path of said stylus, a delay unit for receiving said keying signal at its input and providing a delayed keying signal at its output, means connected to said delay unit for presetting the amount of delay between input and output signals, an oscillation generator coupled to the output of said delay unit, said generator being keyed by said delayed keying signal, a transducer energized by said generator for radiating sonic energy, said transducer being adapted to receive sonic echoes, and a receiver coupled to said transducer and said stylus whereby said stylus is caused to indicate upon said chart the reception of echoes.

References Cited in the file of this patent

UNITED STATES PATENTS

| | | |
|---|---|---|
| 2,419,541 | De Rosa | Apr. 29, 1947 |
| 2,610,244 | Wolf | Sept. 9, 1952 |
| 2,654,881 | Philpott | Oct. 6, 1953 |
| 2,724,826 | Leachman | Nov. 22, 1955 |
| 2,757,354 | Boltzman | July 31, 1956 |